United States Patent [19]

Carella et al.

[11] 3,960,403
[45] June 1, 1976

[54] RETRACTABLE ROOF CLOSURE

[75] Inventors: Richard F. Carella, Mount Clemens; Edward G. Podolan; Francis C. Przybysz, both of Utica, all of Mich.

[73] Assignee: General Motors Corporation, Detroit, Mich.

[22] Filed: Sept. 9, 1974

[21] Appl. No.: 504,040

[52] U.S. Cl. .................... 296/137 B; 52/66; 296/137 G; 296/137 E
[51] Int. Cl.² ........................................ B60J 7/04
[58] Field of Search ........ 296/137 E, 137 C, 137 D, 296/137 B, 137 F, 137 H, 137 G; 52/66, 64; 49/360, 352, 409; 160/113, 123, 207, 189, 346

[56] References Cited
UNITED STATES PATENTS

| | | | |
|---|---|---|---|
| 2,772,917 | 12/1956 | Goldman | 296/137 F |
| 3,107,723 | 10/1963 | Arcuri | 160/346 |
| 3,568,364 | 3/1971 | Schmid | 296/137 E |
| 3,713,689 | 1/1973 | Podolan et al. | 296/137 B |
| 3,720,440 | 3/1973 | Podolan | 296/137 B |
| 3,815,951 | 6/1974 | Nantau et al. | 296/137 F |

FOREIGN PATENTS OR APPLICATIONS

| 229,730 | 2/1963 | Austria | 296/137 E |
|---|---|---|---|

*Primary Examiner*—Robert J. Spar
*Assistant Examiner*—Donald W. Underwood
*Attorney, Agent, or Firm*—H. Furman

[57] ABSTRACT

A retractable roof closure for a vehicle body having a windshield header spaced from a fixed rear roof panel to provide an unobstructed roof opening. The closure panel has its rearward end supported and guided by the cooperation of a guide track extending along each side of the vehicle body beneath the fixed roof panel and guide rollers mounted on the rear end of the closure panel and engaged within the guide track. The forward end of the closure panel is supported by a telescopable extension device on each end of the vehicle body. Each telescopable extension device includes a first member mounted along the fixed roof panel and a second member having its forward end pivotally connected to the forward end of the panel. A third member telescopably connects the first and second members to permit movement of the second member between a forwardly extended position supporting the front end of the closure panel in a closed position and a rearwardly retracted position in which the closure panel is supported and stored beneath the fixed roof panel to open the roof opening. A tape drive assembly includes a tape track mounted on the fixed roof panel and a flexible drive tape movable within the tape track. A connecting link connects the flexible drive tape with the second member to forcibly move the closure panel between open and closed positions.

3 Claims, 5 Drawing Figures

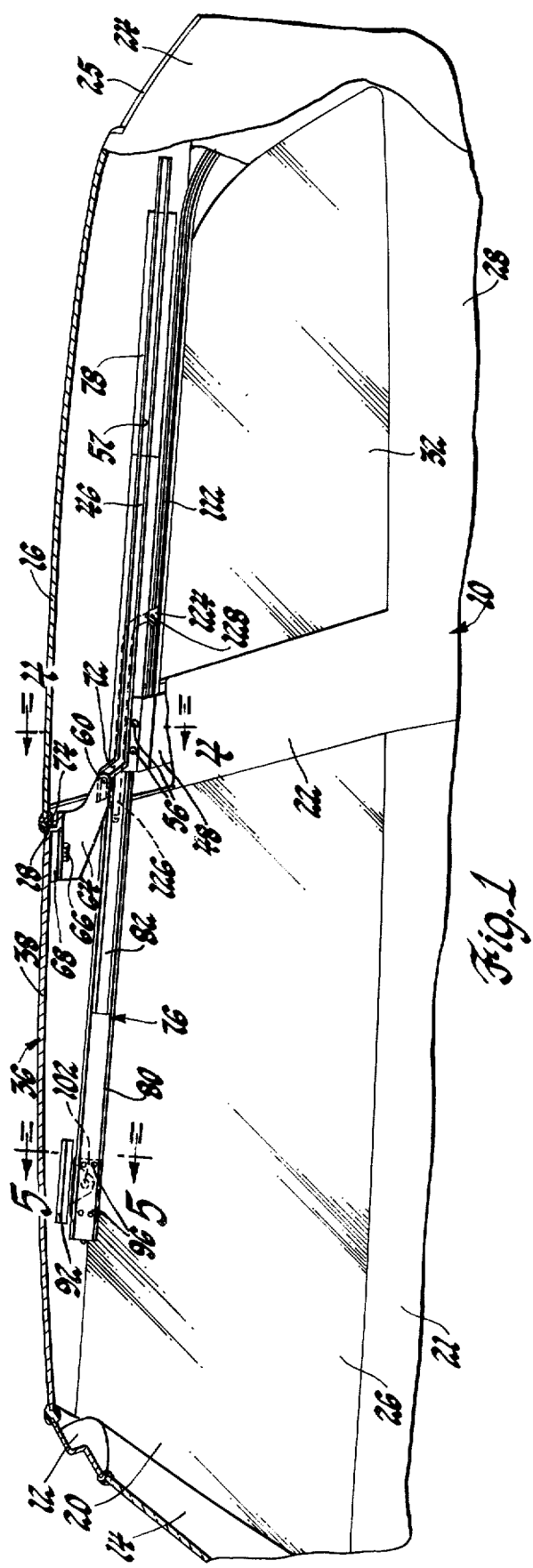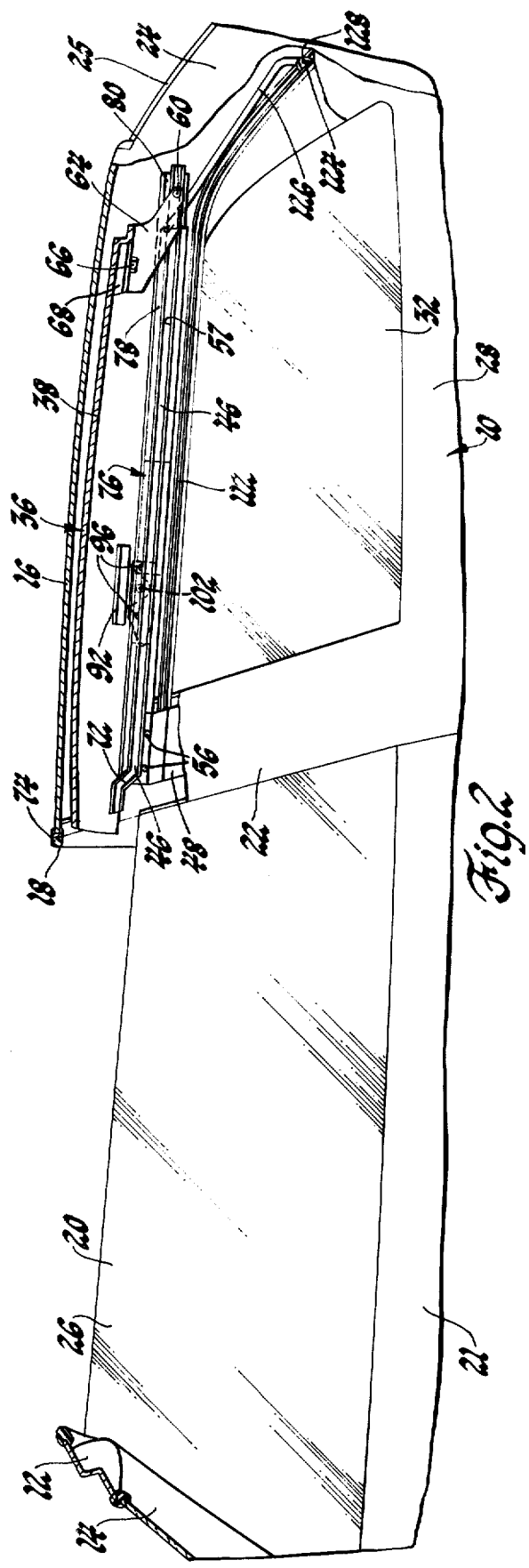

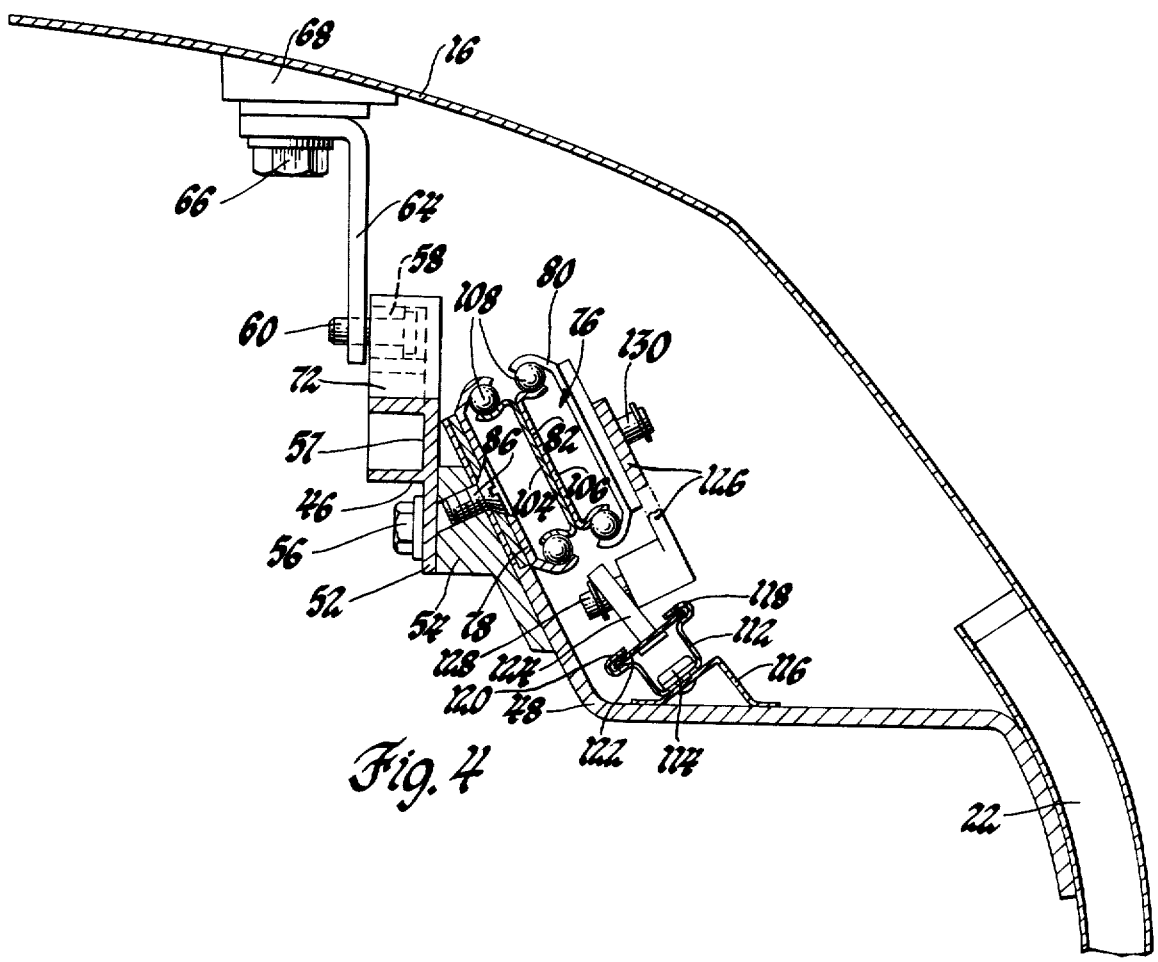
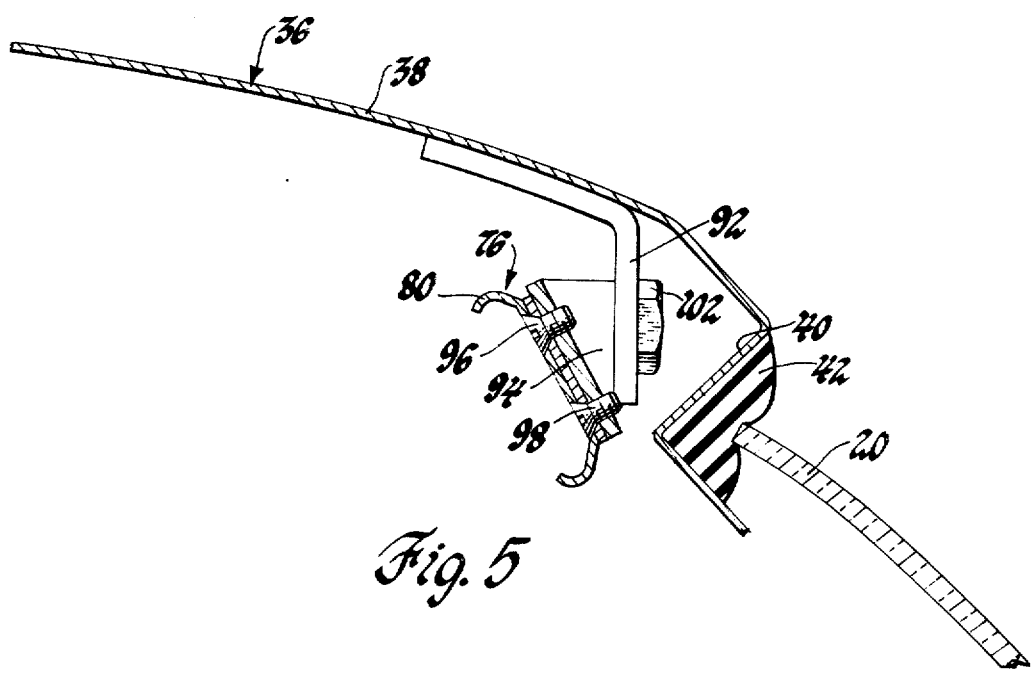

RETRACTABLE ROOF CLOSURE

The invention relates to a vehicle body and in particular to a retractable roof closure for a vehicle body roof opening.

Certain motor vehicles have an unobstructed roof opening which extends the entire width of the vehicle roof from door to door and between the windshield header and a fixed rear roof panel covering the rear portion of the passenger compartment.

This invention provides a retractable roof closure for such a roof opening.

In a two door vehicle body, the unobstructed roof opening is provided between the windshield header and the fixed roof panel. The fixed roof panel has its forward end supported by the roof pillars at the lock pillar edges of the front doors. The vehicle door windows are of the frameless type so that when the windows are opened the front passenger compartment is completely opened above the belt line of the vehicle body.

A closure panel is provided and has its rearward end supported and guided by the cooperation of a guide track extending along each side of the vehicle body beneath the fixed roof panel and guide rollers mounted on the rear end of the closure panel and engaged within the guide tracks. The guide tracks have an inclined portion interposed therein to move the rear end of the closure panel vertically between a raised position flush with the fixed roof panel and a lowered position for storage beneath the fixed panel. The forward end of the closure panel is supported by a telescopable extension device on each side of the vehicle body. Each telescopable extension device includes a first member mounted along the fixed roof panel and a second member having its forward end pivotally connected to the closure panel at a point spaced forwardly of the attachment of the guide rollers. A third member telescopably connects the first and second members to permit rectilinear movement of the second member between a forwardly extended position supporting the front end of the closure panel in closed position and a rearwardly retracted position in which the closure panel is supported in stored position beneath the fixed roof panel to open the roof opening. The closure panel is moved between open and closed positions by a tape drive assembly. The tape drive assembly includes a tape track mounted on the fixed roof panel on each side of the vehicle body and a flexible drive tape which is movable within the tape track by a motor and gear drive assembly. A connecting link connects the flexible drive tape and the second telescopable member so that the tape track can follow a path of motion independent of the rectilinear path of movement of the telescopable extension device.

One feature of the invention is that it provides a retractable roof closure panel which is moved between open and closed positions with respect to an unobstructed opening between the windshield header and the forward edge of a fixed roof panel.

Another feature of the invention is that the retractable roof closure panel has its forward end supported by telescopable extension devices and its rearward end supported by guide rollers riding in body mounted tracks.

Another feature of the invention is that a pivotal connection is made between the telescopable extension device and the retractable closure panel so that the forward end of the closure panel can move rectilinearly while the rear end of the closure panel moves in a vertical direction between a raised position flush with the fixed roof panel and a lowered position for storage beneath the roof panel.

A further feature of the invention is that a connecting link is provided between the telescopable extension device and the tape drive assembly so that the tape drive assembly may follow a path independent of the rectilinear path of movement of the telescopable extension device.

These and other objects, features and advantages of the invention will become apparent upon consideration of the specification and the appended drawings in which:

FIG. 1 is a partial side elevation view of the vehicle body having a retractable roof closure in closed position;

FIG. 2 is a view similar to FIG. 1 showing the retractable roof closure in open position;

FIG. 4 is a sectional view taken in the direction of arrows 4—4 of FIG. 1;

FIG. 5 is a sectional view taken in the direction of arrows 5—5 of FIG. 1.

Figure 3:
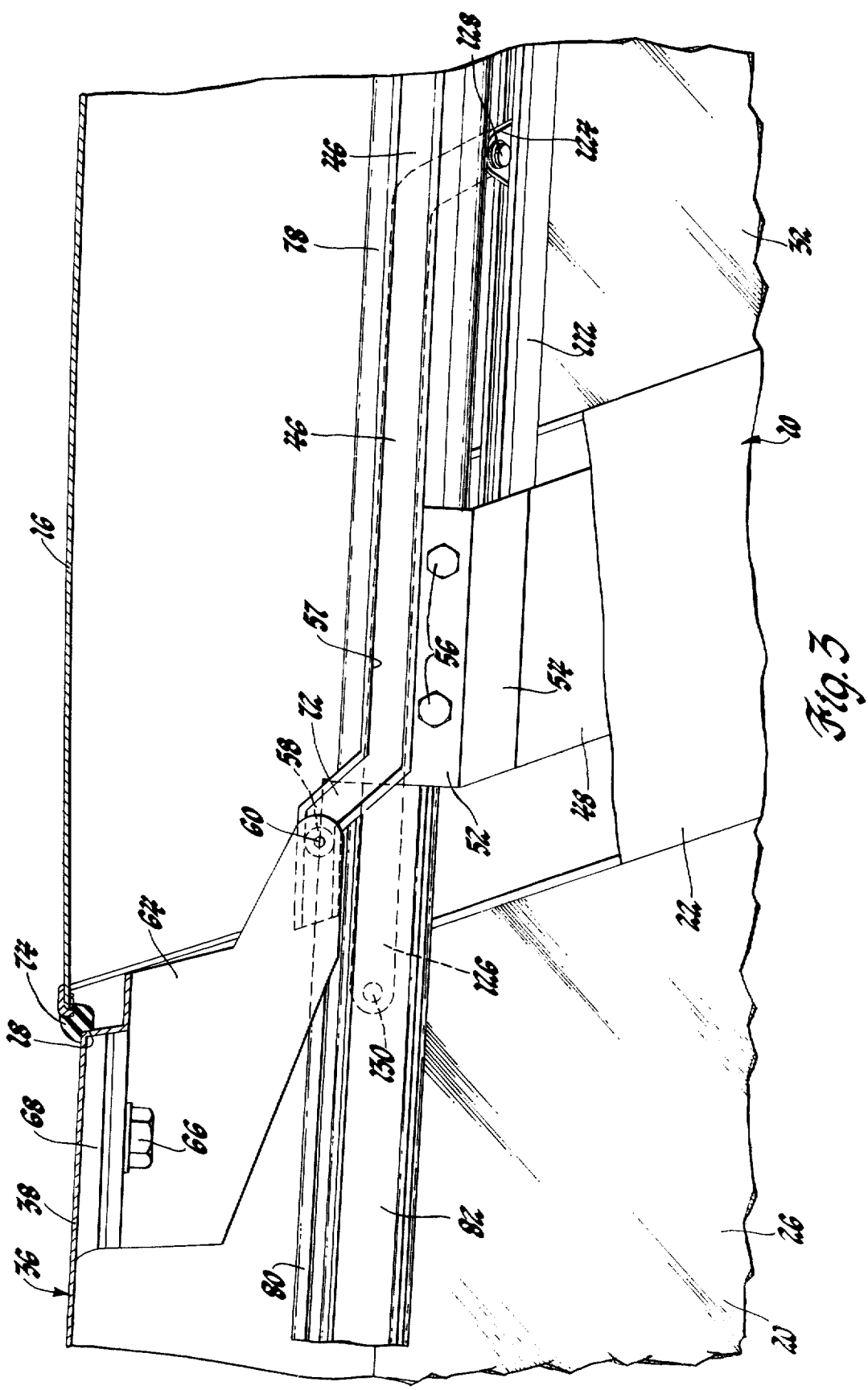
FIG. 3 is an enlarged fragmentary view of FIG. 1.

Referring to FIG. 1, a two door vehicle body indicated generally at 10 is shown, it being understood that the drawing is a sectional view taken along the longitudinal center line of the vehicle body so as to show only that half of the retractable closure panel which is located on the passenger side of the vehicle body. It is noted that the retractable roof closure of this invention is symmetrical about the center line of the vehicle body and while the following description undertakes to describe only that portion of the retractable roof closure which is shown in the drawings as being on the passenger side of the vehicle body, it will be understood that identical structure, not shown, is provided on the driver side of the vehicle body.

The vehicle body 10 includes a windshield header 12 supported by a windshield pillar 14. The vehicle body also includes a fixed roof panel 16 which is spaced substantially from the windshield header 12 to provide a roof opening 18 which extends the entire width of the vehicle body from the window glass 20 of the passenger door 21 to the window of the driver door, not shown. The forward end of the fixed roof panel 16 is conventionally supported by a roof pillar 22 provided at the lock pillar edge of the door 21. The roof panel 16 includes a conventional sail panel 24 and a conventional back light 25. The vehicle body 10 has a front passenger compartment 26 which is situated generally beneath the roof opening 18 and a rear passenger compartment 28 which is situated generally beneath the fixed roof panel 16. The rear passenger compartment 28 has a conventional rear window 32 in the space between the roof pillar 22 and sail panel 24.

A retractable closure panel 36 is provided for closing the opening 18 between the windshield header 12 and the forward edge of the fixed roof panel 16. As best seen in FIG. 5 the retractable closure panel 36 includes an outer panel 38 which spans the vehicle body 10 from the window glass 20 of the passenger door 21 to the window of the driver door, not shown. The outer panel 38 has a flanged structure 40 on its side edge which carries a conventional elastomeric seal 42 for providing a waterproof engagement between the window 20 and the outer panel 38.

Referring to FIGS. 1 and 4 it will be seen that a guide track 46 extends along the vehicle body beneath the fixed roof panel 16. As seen in FIG. 4, a mounting bracket 48 is attached as by welding to the roof pillar 22. The guide track 46 has a mounting leg 52 which is attached to the mounting bracket 48 by a spacer 54 and screw 56. The guide track has a C-shaped opening 57 which opens inwardly and receives a guide roller 58 having a stud 60 attached to the outer panel 38 of the retractable closure panel 36 by a bracket 64, bolt 66, and spacer 68. As seen in FIG. 1, the forward end of guide track 46 has a vertically inclined portion 72 which is effective to move the retractable closure panel 36 vertically between its raised closed position of FIG. 1 in which it is flush with fixed roof panel 16 and a watertight seal 74 is engaged and a somewhat lowered position of FIG. 2 in which the retractable closure panel 36 is stored beneath the fixed roof panel 16. It will be apparent that the cooperation of guide roller 58 in the guide track 46 is effective to guide and support the rear edge of the retractable closure panel 36 during the course of its movement between the closed position of FIG. 1 and the open position of FIG. 2.

The forward end of retractable closure panel 36 is supported by a telescopable extension device generally indicated at 76. The telescopable extension device 76 includes an inner track member 78, an outer track member 80, and a central track member 82. The rearward end of inner track member 78 is also suitably attached to fixed roof panel 16. The inner track member 78 is channel shaped and has its forward end attached to the mounting bracket 48 by a screw 86. The inner track member 78 extends beneath and along the fixed roof panel 16. The outer track member 80 is a similar channel shaped member of substantially the same length as the inner track member 78 and has its forward end pivotally attached to the retractable closure panel 36. A spacer 94 is attached to outer track member 80 by screws 96 and 98. The spacer 94 abuts bracket 92 and is pivotally attached thereto by a pivot bolt 102. As seen in FIG. 4 the central track member 82 includes channel members 104 and 106 which are attached back to back and fit respectively within the inner track member 78 and outer track member 80. Bearing balls 108 are engaged between the central member 82 and the inner and outer track members 78 and 80 to provide relatively frictionless longitudinal telescoping movement between the respective members. When the retractable closure panel 36 is in its closed position of FIG. 1, the outer track member 80 is fully extended from the inner track member 78 and cantilevered therefrom by the inner track assembly 82. When the retractable closure panel 36 is in the open position of FIG. 2 the outer track member 80 and central track member 82 are in rearwardly retracted positions in which they are stored generally within the length of the inner track member 78.

Thus it is seen that the telescopable extension device 76 guides and supports the forward portion of the retractable roof closure 36 during its course of rectilinear movement between the closed position of FIG. 1 and the open position of FIG. 2. The pivotal connection between the telescopable extension device 76 and the retractable roof closure 36 as provided by pivot bolt 102 accommodates the vertical movement of the retractable closure panel as the roller 58 traverses the inclined portion 72 of the guide track 46.

Power operation of the retractable closure panel 36 between the open and closed positions is provided by a tape drive system. Referring to FIGS. 1 and 4 it will be seen that a tape track 112 extends longitudinally of the vehicle beneath the fixed roof panel 16 and is attached by rivet 114 to a bracket 116 welded to the mounting bracket 48. The tape track has inwardly directed flanges 118 and 120 which capture a flexible drive tape 122. As seen in FIG. 1, the tape track 112 extends from a point at the roof pillar 22 rearwardly and curves downwardly through the sail panel 24 to a conventional motor and gear drive assembly located in the trunk of the vehicle or in an equally convenient location rearwardly of the rear seat passenger. The flexible drive tape 122 has perforations spaced along its length which are engageable by a drive gear so that the flexible drive tape 122 is translated longitudinally of the vehicle within the tape track 112. As seen in FIGS. 3 and 4, a drive tang 124 is attached to and extends upwardly from the flexible drive tape 122. An elongated drive link 126 has its one end attached to the drive tang 124 by a pivot 128 and its other end attached by a pivot 130 to the outer track member 80. It will be apparent that longitudinal movement of the flexible drive tape 122 within the tape track will be effective to translate the retractable closure panel 36 longitudinally of the vehicle body between the closed position of FIG. 1 and the open position of FIG. 2. The elongated drive link 126 permits the tape track 112 to begin its gradual downward sweeping movement into the sail panel 24 at a point forwardly of the fully retracted position of the outer track member 80. Such a gradual downward sweep assures frictionless operation and prevents binding of the flexible drive tape 122 within the tape track 12.

Thus it is seen that the invention provides an improved retractable roof closure for a vehicle body.

What is claimed is:

1. In a vehicle body having a passenger compartment, a fixed roof panel supported at its forward edge by roof pillars, and a windshield header spaced from the fixed roof panel to provide an unobstructed roof opening, a retractable closure for selectively opening and closing the roof opening comprising: a one-piece rigid closure panel, a guide track mounted on the fixed roof panel on each side of the vehicle body, roller means mounted on the rear end of the closure panel and movable within the guide track means to guide and support the rear end of the closure panel, a telescopable extension device on each side of the vehicle body for guiding and supporting the front end of the closure panel, said telescopable extension device including a first member mounted along the fixed roof panel, a second member having its forward end connected to the closure panel, and a third member telescopably connecting the first and second members and permitting movement of the second member between a forwardly extended position supporting the front end of the closure panel in position closing the roof opening and a rearwardly retracted position in which the closure panel is supported in stored position beneath the fixed roof panel to open the roof opening.

2. In a vehicle body having a passenger compartment, a fixed roof panel supported at its forward edge by roof pillars, and a windshield header spaced from the fixed roof panel to provide an unobstructed roof opening, a retractable closure for selectively opening and closing the roof opening comprising: a one-piece rigid closure panel, a longitudinally extending guide track mounted on the fixed roof panel on each side of the vehicle body, roller means mounted adjacent the rear end of the closure panel and movable within the guide track means to guide and support the rear end of the closure panel, said guide track having a vertically inclined portion interposed therein to effect vertical movement of the closure panel between a raised position flush with the fixed roof panel and a lowered position for storage position beneath the fixed roof panel, a telescopable extension device on each side of the vehicle body for supporting the forward end of the closure panel, said telescopable extension devices including a first member fixedly mounted along the fixed roof panel, a second member, pivot means pivotally attaching the forward end of the second member to the closure panel to permit vertical movement of the rear end of the closure panel while the forward end of the closure panel is moved rectilinearly, and a third member telescopably connecting the first and second members to provide rectilinear movement of the second member between a forwardly extended position supporting the front end of the closure panel in position closing the roof opening and a rearwardly retracted position in which the closure panel is supported in stored position beneath the fixed roof panel to open the roof opening.

3. In a vehicle body having a passenger compartment, a fixed roof panel supported at its forward edge by roof pillars, and a windshield header spaced from the fixed roof panel to provide an unobstructed roof opening, a retractable closure for selectively opening and closing the roof opening comprising: a one-piece rigid closure panel, a longitudinally extending guide track mounted on the fixed roof panel on each side of the vehicle body, roller means mounted adjacent the rear end of the closure panel and movable within the guide track means to guide and support the rear end of the closure panel, said guide track having a vertically inclined portion interposed therein to effect vertical movement of the rear end of the closure panel between a forwardly extended raised position flush with the fixed roof panel to close the roof opening and a rearwardly retracted lowered position for storage beneath the fixed roof panel to open the roof opening, a telescopable extension device on each side of the vehicle body acting between the fixed roof panel and the closure panel to support and guide the forward end of the closure panel, pivot means attaching the telescopable extension device to the forward end of the closure panel to permit rectilinear movement of the telescopable extension device and the forward end of the closure panel during vertical movement of the rear end of the closure panel, and longitudinally extending drive means mounted on the fixed roof panel for operating said closure panel between forwardly extended and rearwardly retracted position, said drive means including a track having a longitudinally movable driven member therein, and link means connecting the driven member and the retractable closure to permit the drive means to follow a path of longitudinal movement independent of the path of movement of the retractable closure panel.

* * * * *